3,398,526
GAS TURBINE AND FUEL DELIVERY
MEANS THEREFOR
Emery E. Olah, St. Charles, Ill., assignor to Turbine Products, Inc., St. Charles, Ill., a corporation of Illinois
Filed July 21, 1966, Ser. No. 566,857
8 Claims. (Cl. 60—39.28)

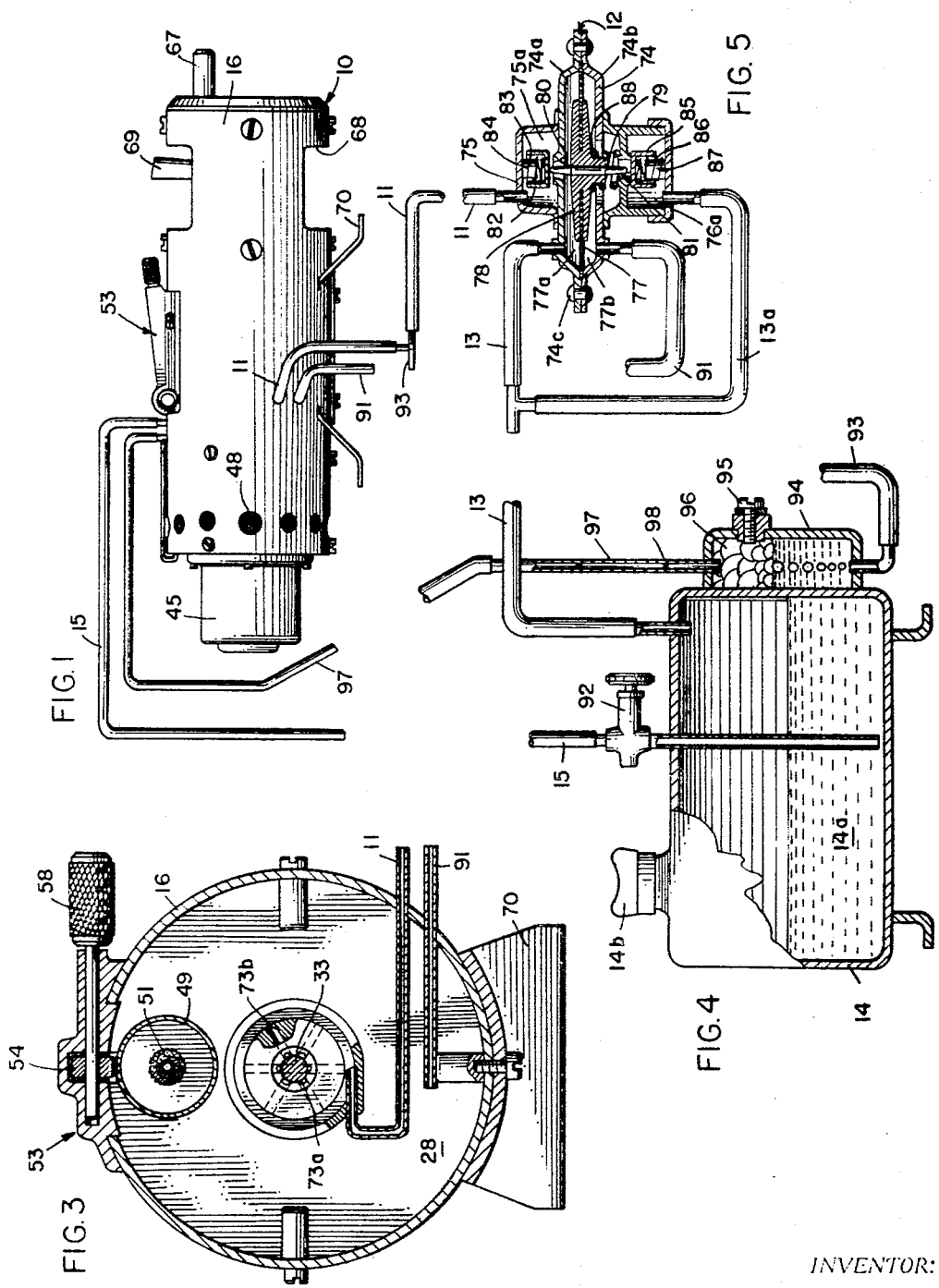

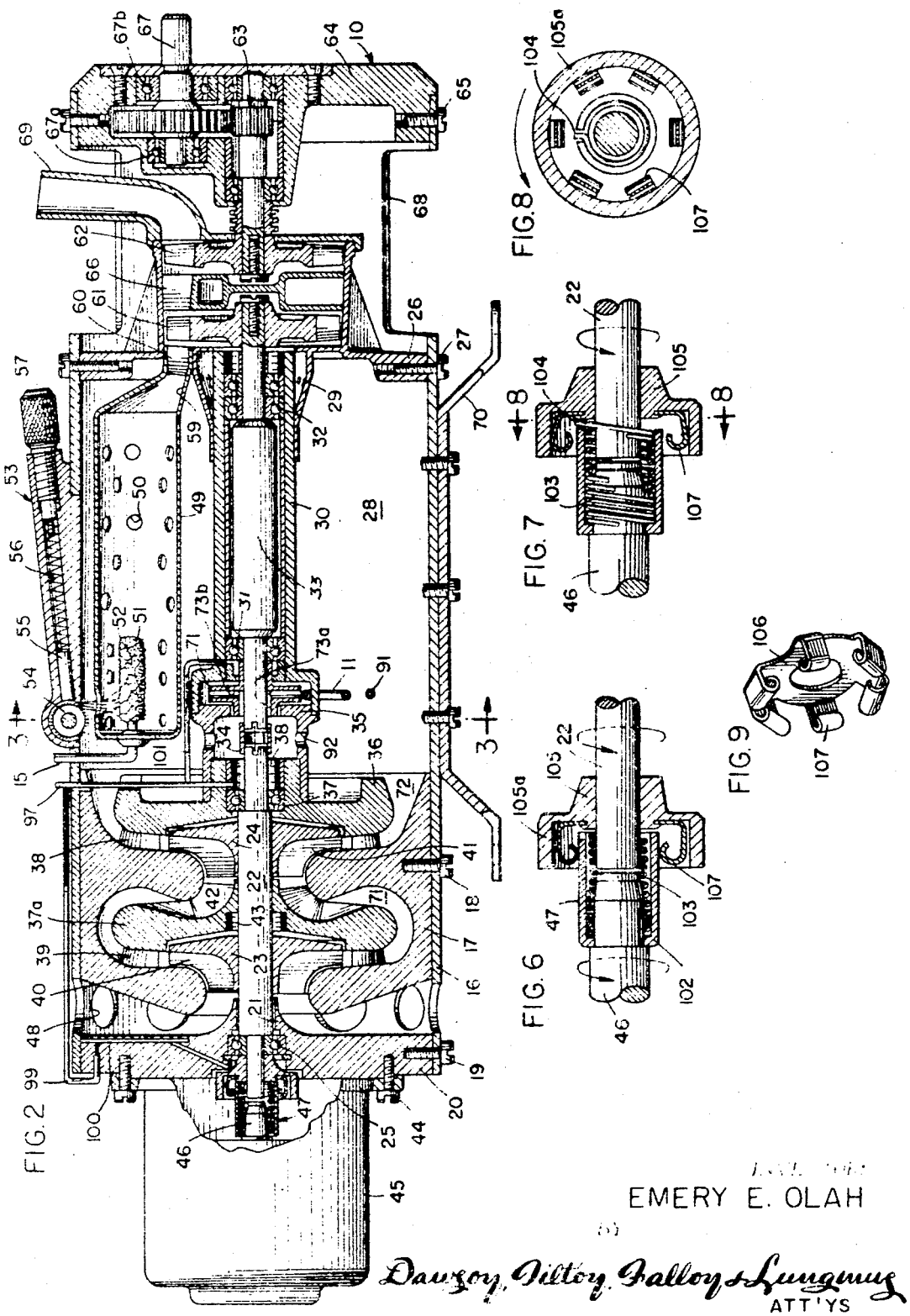

ABSTRACT OF THE DISCLOSURE

A gas turbine engine fuel system wherein the fuel reservoir is maintained under air pressure at a substantially constant ratio with the combustion chamber pressure. The engine compressor delivers air to the chamber where it is heated by burning the fuel delivered thereto from the reservoir. The heated air motivates a turbine whose shaft drives the compressor. Said shaft also drives an impeller which compresses further some of the air compressed by said compressor and delivers it to the reservoir, the pressure in the latter being controlled by regulating means responsive to the differential in pressures in the chamber and reservoir.

---

This invention relates to a miniature gas turbine, and more particularly, to a prime mover of such a small size as to develop as low as ⅛ horsepower. Following the general approach of the invention which leads to the successful construction of such a small turbine, it is possible to construct larger units by engineering some components on a larger scale and by using multiple burners. Thus, turbines up to 100 horsepower or larger can be built using the principles of this invention.

A particular problem in the production of miniature gas turbines has been the providing of a fuel delivery system for the turbine. Large gas turbines employ nozzles to which the fuel is delivered under pressure considerably greater than the pressure existing in the combustion chamber of the turbine so that the fuel will be atomized as it passes through the nozzle and will be sprayed into the combustion chamber for combustion. However, the use of nozzles for delivering the fuel into the combustion chamber becomes impractical and inefficient when the turbine is scaled down to a size capable of delivering of the order of a few horsepower because the nozzle orifice must also be scaled down to such a point that almost any small particle of dust or other impurity in the fuel will clog the orifice of the nozzle, causing breakdown in operation. In addition, means must be provided for subjecting the fuel to a pressure 150 p.s.i. to 3000 p.s.i. above the already high pressure existing in the compression chamber, or the fuel will not be atomized as it passes through the nozzle.

Further problems in turbine construction are encountered when a means for lubricating the moving parts of the turbine is considered. These parts rotate at extremely high speeds and a dependable lubricating system must be employed to ensure against the possibility of damage caused by friction and the heat generated thereby.

Accordingly, among the general objectives of this invention is the provision of an operable miniature gas turbine embodying novel features. Another object of the invention is to provide a fuel-delivery system effective for pumping very small quantities of fuel and for delivering the fuel to the compression chamber under a pressure only slightly greater than the pressure existing in the compression chamber.

A further object of the invention is to provide a fuel-delivery system which uses the compressed air in the compression chamber for delivering the fuel to the combustion means.

Still another object of the invention is to provide a unique combustion system in a miniature gas turbine that eliminates the difficulties inherent in using a high-pressure spray nozzle.

Another object of the invention is to provide novel lubricating means for delivering lubricant to the moving parts of the turbine under the influence of the air inside the compression chamber.

Other objects and advantages of the invention may be seen in the details of construction and operation set down in this specification.

The invention is explained in conjunction with an illustrative embodiment in the accompanying drawing, in which:

FIG. 1 is a side view of the turbine;
FIG. 2 is an enlarged sectional view of the turbine shown in FIG. 1;
FIG. 3 is a transverse sectional view as would be seen along the line 3—3 of FIG. 2;
FIG. 4 is an enlarged sectional view of the fuel reservoir;
FIG. 5 is an enlarged view of the fuel-regulating means;
FIG. 6 is an enlarged fragmentary view of FIG. 2 showing the clutch means of the turbine;
FIG. 7 is an enlarged fragmentary view of the clutch means in another position;
FIG. 8 is a sectional view taken along the line 8—8 of FIG. 7; and
FIG. 9 is an enlarged perspective view of one of the clutch parts.

Referring now to FIGS. 1, 4 and 5, and as will be explained more fully below, after initial startup of the gas turbine, designated generally by the numeral 10, air is forced from the turbine 10 through conduit 11, through regulating assembly 12, through conduit 13 and into fuel reservoir 14. Fuel 14a is pumped from fuel reservoir 14 through fuel line 15 into turbine 10.

Gas turbine

The turbine 10 includes a generally-cylindrical turbine housing 16 and a compressor housing 17 secured to said turbine housing by screws 18. Fitted on the extreme left end of turbine housing 16, and attached thereto by means of screws 19, is closure 20. Closure 20 is provided with an axial bore for the receipt of compressor wheel shaft 22 which has attached thereto first compressor wheel 23 and second compressor wheel 24. A suitable bearing as at 25 is provided in an enlargement of the bore 21 for the shaft 22.

The right end of turbine housing 16 is provided with closure 26 attached to the housing by screws 27. Thus, turbine housing 16, right closure 26, and the right end of compressor housing 17 are seen to provide compression chamber 28. Closure 26 is provided with axially-extending sleeve 29 for the support of shaft housing 30. Fitted within shaft housing 30 and supported therein by bearings 31 and 32, is main shaft 33. Main shaft 33 is connected to compressor wheel shaft 22 by connector sleeve 34. Although the main shaft and the compressor wheel shaft may be formed integrally, it is desirable to have two connected shafts in order to minimize vibration at high rotational speeds.

The left end of shaft housing 30 is supported by adaptor sleeve 35, which in turn is secured to bearing housing 36. Provided within bearing housing 36 are bearings 37 and labyrinth seal 38.

Bearing housing 36 and stationary diffuser 37a are secured to compressor housing 17 by second-stage diffuser vanes 38 and first-stage diffuser vanes 39 respectively. First-stage compressor wheel 23 supports impeller 40 and second-stage compressor wheel 24 supports impeller 41.

Guide vanes 42 extend between stationary diffuser 37a and compressor housing 17. Provided within stationary diffuser 37a adjacent compressor wheel shaft 22 is labyrinth seal 43.

Secured to close 20 by screws 44 is starter 45. No claim is made in this application for the starter 45 and any conventional starting mechanism, such as an electric motor or spring-wound starter may be used which will deliver rotational movement to starter shaft 46. Starter shaft 46 may be connected to compressor wheel shaft 22 by means of clutch assembly 47, so that compressor wheel shaft 22 may be disconnected from starter shaft 46 after the turbine is in operation.

Disposed within the central portion of turbine housing 16 is combustion chamber 49. Combustion chamber 49 is generally cylindrical in shape and may be formed of heat-resistant sheet metal having openings 50 provided therein. Extending into combustion chamber 49 is fuel line 15 and secured thereto is wick 51. Wick 51 is preferably constructed of porous material having high temperature resistance, such as asbestos, and may be reinforced on its surface by wire mesh 52.

Attached to turbine housing 16 adjacent wick 51 is igniter assembly 53. Igniter assembly 53 includes spark wheel 54, flint 55, loading spring 56 and retaining screw 57. As can be seen in FIG. 3, spark wheel 54 is mounted on knurled thumbscrew 58.

The combustion chamber 49 ends in neck portion 59 which extends through closure 26. Disposed within neck portion 59 are first-stage turbine nozzle blades 60. Adjacent nozzle blades 60 is first-stage turbine wheel 61, which is secured to main shaft 33. Second-stage turbine wheel 62 is connected to gear-reduction assembly 63 disposed within gear-reduction housing 64. Gear-reduction housing 64 is attached to turbine housing 16 by screws 65. Interposed between first turbine wheel 61 and second turbine wheel 62, and mounted on closure 26, are second-stage nozzle blades 66.

Gear-reduction assembly 63, which is of conventional construction and which connects second-stage turbine wheel 62 to driveshaft 67 may be eliminated if desired, and second-stage turbine wheel 62 may be connected directly to driveshaft 67, which is suitably journaled in ball bearings 67a and 67b. Gas turbine housing 16 may be provided with large ventilation openings 68 adjacent gear-reduction assembly 63 to provide ventilation thereto. Extending through openings 68 is exhaust tube 69, which is secured to closure 26 adjacent second turbine wheel 62.

Gas turbine 10 may be secured in place by means of bracket 70 attached to turbine housing 16.

*Steady state operation*

After startup of the turbine, which will be explained in detail below, the main shaft 33 and compressor shaft 22 rotate, causing compressor wheels 23 and 24 to rotate. Air enters air intake openings 48 provided in the turbine housing under the influence of first compressor wheel 23 and is driven by impellers 40 past diffusers 39 into restricted portion 71 between stationary diffuser 37a and compressor housing 17. As the air is forced into restricted portion 71, it is compressed. The compressed air then passes from restricted portion 71 past guide vanes 42, which decreases air turbulence, and is again compressed by second-stage impellers 41 and diffusers 38 and driven into delivery passage 72.

Most of the compressed air in compression chamber 28 then passes into combustion chamber 49 through the openings 50, where it contacts fuel diffused on wick 51. Fuel is supplied to wick 51 through fuel line 15, and the fuel on the wick is in a state of combustion, having previously been ignited by igniter assembly 53. Fuel is continuously delivered to wick 51 by the fuel-delivery means, to be described more fully below.

The hot air and combustion products leaving the neck portion 59 of the combustion chamber pass the first-stage turbine nozzle blades 60, which partially convert the pressure of the hot gases into a high-velocity jet which impinges the first-stage turbine wheel 61, causing it to rotate and drive main shaft 33 and compressor shaft 22. The remainder of the energy of the high-velocity jet is used to drive second turbine wheel 62, causing output driveshaft 67 to rotate. The exhaust fumes leaving the second-stage turbine wheel are delivered to the atmosphere by exhaust 69.

Thus, the rotation of the first-stage turbine wheel provides for the continued operation of the turbine by rotating main shaft 33 and compressor wheel shaft 22 while the second-stage turbine wheel rotates the output driveshaft of the turbine.

*Fuel delivery system*

Fuel is continuously delivered to the wick 51 by means of a unique fuel-delivery means. Secured to main shaft 33 within an enlargement of shaft housing 30 is impeller 71 (see FIGS. 2 and 3). Impeller 71 is provided with a plurality of axially-extending intake channels 73a and a radially-extending outlet bore 73b associated with each inlet channel.

Conduit 11 extends through main shaft housing adjacent the outer perimeter of impeller 71 and extends from main shaft housing through turbine housing 16 to regulator assembly 12 (see FIGS. 1, 2, 3 and 5).

Regulator assembly 12 includes diaphragm housing 74 comprised of upper dish 74a and lower dish 74b which are joined by rivets 74c. First valve chamber housing 75 and second valve chamber housing 76 are attached to upper dish 74a and lower dish 74b, respectively. Disposed within diaphragm housing 74 and secured between upper and lower dishes 74a and 74b, is diaphragm 77 which is provided with reinforcing disc 78. Regulating pin 79 extends through a bore provided in reinforcing disc 78 and also extends into first valve opening 80 and second valve opening 81 provided in upper dish 74a and second valve chamber housing 76.

First valve 82 disposed within first valve housing 75 is biased toward first valve opening 80 by hairspring 83, which is guided by pin 84. Pin 84 is secured to first valve housing 75. Second valve 85 is biased toward second valve opening 81 by hairspring 86, which is guided by pin 87 which is in turn secured to second valve housing 76.

Regulating spring 88 biases reinforcing disc 78 and regulating pin 79 upwardly into the position shown in FIG. 5 when the turbine and fuel-delivery system is inoperative. In this position, first valve 82 is in the open position and second valve 85 is in the closed position.

Upper diaphragm chamber 77a provided by diaphragm 77 and upper dish 74a is connected to fuel reservoir 14 by conduit 13 (see FIGS. 4 and 5). Upper diaphragm chamber 77a is also connected to second valve chamber 76a provided by second valve chamber housing 76 by conduits 13 and 13a. Lower diaphragm chamber 77b provided by diaphragm 77 and lower dish 74b is connected to compression chamber 28 by conduit 91 (see FIGS. 1, 3 and 5).

The operation of the fuel-delivery system will now be explained. During operation of the turbine, the impeller 71 rotates with the main shaft 33. Openings 92 are provided in adapter sleeve 34 so that compressed air in compression chamber 28 may reach axial channels 73a of impeller 71. The rotation of impeller 71 causes the compressed air in channels 73a to be forced radially outwardly through bores 73b under centrifugal force (see FIGS. 2 and 3). The air delivered to conduit 11 at the outer periphery of impeller 71 is thus under even greater pressure than the air in combustion chamber 28. The air delivered to conduit 11 passes through first valve chamber 75a, upper diaphragm chamber 77a, through conduit 13 and into fuel reservoir 14. The pressure existing in fuel reservoir 14 forces fuel 14a through fuel line 15. The fuel is then delivered to wick 51 (see FIGS. 1 and 2) where it is diffused for combustion. Thus, it is seen that the only driving force for delivering the fuel to the combustion chamber is pressurized air from the compression chamber. The pressure in the combustion chamber 49 equals that in the compression chamber because the combustion chamber communicates with the compression chamber by virtue of openings 50.

Since the fuel delivered to the combustion chamber is diffused over a wick rather than sprayed through a high-pressure nozzle, the fuel may be delivered to the combustion chamber at a pressure only one or two pounds above the pressure existing in the combustion chamber. In contrast to this, in ordinary turbines using fuel nozzles, the fuel must be delivered to the nozzle at a pressure of 150 p.s.i. to 3000 p.s.i. greater than the pressure existing in the combustion chamber. The differential pressure of one or two pounds is provided by further increasing the pressure of the air in the compression chamber by the impeller.

For optimum operation, the differential pressure between the fuel reservoir 14 and compression chamber 28 should be constant, so that fuel is delivered to wick 51 at a regular rate. The impeller 71, however, is not able to provide a constant differential pressure because the pressure of air delivered by the impeller is a function of the rate of rotation of the impeller. Accordingly, regulator assembly 12 is provided so that the pressure in fuel reservoir 14 maintains a constant differential with the pressure in compression chamber 28 when the turbine accelerates or decelerates. Without the regulator, the operation of the turbine would be inherently unstable. For example, if the turbine decelerated, the decrease in turbine speed would cause a decrease in fuel flow rate, resulting in a further decrease in turbine speed, and so on. Similarly, acceleration of the turbine would result in a continuous increase in turbine speed, eventually causing the turbine to exceed the limit of safe operation.

When the turbine is inoperative, the regulating assembly is in the position shown in FIG. 5. Regulating spring 88 may be adjusted so that the regulating assembly will operate at any desired pressure differential. For purposes of explanation, a differential of one p.s.i. is chosen. If the speed of the turbine increases, the differential between the pressure of the air delivered by the impeller and the pressure in the compression chamber also increases, which causes the pressure in first valve chamber 75a and upper diaphragm chamber 77a to increase. The pressure in lower diaphragm chamber 77b is equal to the pressure in compression chamber 28 because lower diaphragm chamber 77b is connected to compression chamber 28 by conduit 91. Thus, the increased pressure differential between upper and lower diaphragm chambers causes the diaphragm 77 and regulating pin 79 to move downwardly, thereby causing first valve 82 to close and preventing the increased pressure from reaching fuel reservoir 14. As fuel is forced out of fuel reservoir 14 and the pressure in fuel reservoir decreases causing a corresponding pressure decrease in upper diaphragm chamber 77a, the diaphragm and regulating pin move upwardly to lift first valve 82 for a short time to allow the fuel reservoir to be further pressurized. It is seen that regardless of the pressure differential between the air in conduit 11 and the air in compression chamber 28, the pressure differential between the air in fuel reservoir 14 and the air in compression chamber 28 is maintained constant.

If the turbine slows down, causing a decrease in the pressure in compression chamber 28, and the corresponding increase in the pressure differential between fuel reservoir 14 and compression chamber 28, the pressure delivered to upper diaphragm chamber 77a by conduit 13 will cause the diaphragm and regulating pin to move downwardly, opening lower valve 85 and allowing the pressure in fuel reservoir 14 to "blow off" through conduit 13a, second valve opening 81, and through conduit 91 to the compression chamber. The diaphragm will move downwardly because the pressure in lower diaphragm 77b is always equal to that in the compression chamber by virtue of conduit 91.

Thus, it is seen that regardless of the speed of the turbine, the pressure in the compression chamber and the pressure in the fuel reservoir which forces the fuel into the combustion chamber will always be maintained at the desired low-pressure differential. It has been found that a pressure differential of about one pound per square inch enables the turbine to operate efficiently and smoothly.

Needle valve 92, interposed in fuel line 15 (see FIG. 4) allows the rate at which fuel is delivered to wick 51 to be regulated, thereby regulating the rate of combustion and the consequent speed of the turbine. The turbine may be shut down by completely closing needle valve 92. The fuel reservoir may be filled by removing cap 14b, which effects an airtight seal with the fuel reservoir.

Lubrication of the moving parts of the turbine is also accomplished by means of the pressurized air forced through conduit 11 by impeller 71. As seen in FIG. 1, conduit 93 branches from conduit 11 and enters the bottom of oil reservoir 94 which is provided with fill plug 95. The pressurized air entering the bottom of oil reservoir 94 causes the oil to foam as at 96 and subsequently forces the oil bubbles into oil line 97 where the oil bubbles break up into drops 98. When oil line 97 reaches turbine housing 16, it branches into capillary tube 99 (see FIG. 2). Some oil drops travel through capillary tube 99 and through a series of cross-drilled oil channels 100 in closure 20 to ball bearings 25. The vacuum created by the impeller wheels draws excess oil from ball bearings 25 along compressor shaft 23 where it is eventually mixed with air drawn by compressor wheels 23 and 24 to be subsequently burned in the combustion chamber.

Ball bearings 37 are lubricated by oil flowing through oil line 97 and ball bearings 31 are lubricated by oil flowing through oil line 101, which branches from oil line 97. Excess oil deposited on ball bearings 31 is atomized by the high-speed rotation of the bearings, and the oil mist travels along main shaft 33 to lubricate bearings 32.

As seen in FIG. 1, conduit 93 branches from conduit 11 before conduit 11 reaches regulator assembly 12 so that the pressure of the air forced into oil reservoir 94 is unregulated. Thus, when the turbine speeds up causing an increase in air pressure in conduits 11 and 93, the flow of oil through oil line 97 also increases. The flow of lubricant to the moving parts is therefore directly proportional to the speed of these parts, which is in accordance with lubricating requirements.

*Startup*

The startup of the turbine will now be described. Referring now to FIG. 2, the starter 45 may be an electric motor, a wound-spring coil or other suitable means for providing rotation to starter shaft 46. It is desirable to have a clutch connecting starter shaft 46 and compressor shaft 22 so that the starter may be disengaged from the turbine after the latter has attained self-operation.

A preferred embodiment of clutch assemby 47 will be described with reference to FIGS. 6–9. Sleeve 102 is slidably received on starter shaft 46 and abuts a shoulder provided thereon. Starter shaft 46 narrows from a diameter slightly larger than that of compressor shaft 22 to a diameter of approximately equal that of a compressor shaft 22. Received on driveshaft 46 within sleeve 102 is clutch spring 103. Clutch spring 103 has a slight interference fit with starter shaft 46. Both sleeve 102 and clutch spring 103 extend beyond the end of starter shaft 46 into overlapping relationship with compressor shaft 22. However, clutch spring 103 does not contact compressor shaft 22 either during operation or when the turbine is at rest. The last coil of clutch spring 103 ends in a radially-outwardly extending finger portion 104 which is received in a slot provided in sleeve 102 (see FIGS. 7 and 8).

Clutch housing 105 is immovably secured to compressor shaft 22, and affixed to clutch housing 105 is gripper spring 106. Gripper spring 106 is advantageously made of spring sheet metal and includes claws 107 which extend axially over sleeve 102 and grip sleeve 102 tightly.

When the starter is activated, causing starter shaft 46 to rotate in the direction of the arrows in FIG. 6, the interference fit of spring 103 with starter shaft 46 urges spring 103 to rotate with starter shaft 46. Sleeve 102 is restrained against rotational movement by claws 107, and finger 104 of clutch spring 103 is likewise restrained against movement. As the starter shaft continues to rotate, the clutch spring 103 is wound tightly around the starter shaft and subsequently is wound tightly around compressor shaft 22. Compressor shaft 22 is then caused to rotate with starter shaft 46, since the direction of winding of clutch spring 103 is such that when starter shaft 46 is driving compressor shaft 22, the spring tightens against both shafts.

Main shaft 33 and impeller 71 also rotate with compressor shaft 22, and compressed air entering compression chamber 28 under the influence of compressor wheels 23 and 24 is further compressed by impeller 71 and forced through conduit 11 to fuel reservoir 14. Fuel is forced from the fuel reservoir to wick 51 and diffuses on said wick. The fuel reaches the wick in a matter of one or two seconds, at which time spark wheel 54 is rotated by thumbscrew 58, causing sparks to hit wick 51 and ignite the fuel.

When the starter brings the turbine up to about 40% of its rotational speed, the turbine becomes self-operational and begins to rotate faster than the starter shaft. At this point, the relative torque between starter shaft 46 and compressor shaft 22 changes direction and clutch spring 103 begins to unwind and eventually begins to slip on shaft 22. As the speed of compressor shaft 22 increases, claws 107 are forced radially outwardly under the influence of centrifugal force and no longer contact sleeve 12. Perimetrically-extending shoulder 105a of clutch housing 105 restrains claws 107 from excessive outward movement. Spring 103 then completely unwinds and no longer contacts compressor shaft 22. Thus, during operation of the turbine there is no contact whatsoever between starter 45 and the gas turbine, and drag and heat caused by sliding friction is eliminated.

From the foregoing, it is seen that a gas turbine has been provided with a unique fuel-delivery system which utilizes the pressure generated by the turbine itself to force fuel into the combustion chamber. The fuel is diffused on a wick in the combustion chamber rather than being sprayed through a nozzle, so that the fuel may be introduced into the combustion chamber at a pressure only slightly greater than the pressure existing in the chamber.

While in the foregoing specification a detailed embodiment of the invention is set forth for the purposes of illustration, it is to be understood that many of the details hereingiven may be varied considerably without departing from the spirit and scope of the invention.

I claim:

1. In a gas turbine, a casing providing a compression chamber, compression wheel means and turbine wheel means operably associated with said compression chamber, combustion means in said compression chamber, said combustion means including wick means and fuel delivery means, said fuel delivery means including fuel reservoir means and impeller means driven by said turbine wheel means for delivering air from said compression chamber to said fuel reservoir means under pressure greater than the pressure in said chamber, and regulating means interposed between said impeller means and said fuel reservoir means for maintaining a substantially constant pressure differential between the pressure of air delivered to said fuel reservoir means and said chamber pressure.

2. The gas turbine of claim 1 in which said regulating means includes a diaphragm responsive to the pressure of said impeller-delivered air and said chamber pressure, first valve means operable by said diaphragm interposed between said impeller means and said fuel reservoir means, and second valve means operable by said diaphragm interposed between said compression chamber and said fuel reservoir means.

3. In a gas turbine, a casing providing a compression chamber, compression wheel means and turbine wheel means operably associated with said compression chamber, combustion chamber means in said compression chamber, fuel reservoir means associated with said combustion chamber means, and impeller means in said compression chamber driven by said turbine wheel means for delivering air from said compression chamber to said fuel reservoir means under pressure greater than the pressure in said compression chamber, whereby fuel is forced from said fuel reservoir means to said combustion chamber means, a shaft journalled in said casing, said turbine wheel means and said compression wheel means being mounted on said shaft, said impeller means including an impeller wheel mounted on said shaft, said impeller wheel including an air intake adjacent said shaft and an air outlet spaced radially outwardly of said air intake, regulating means, conduit means extending from said air outlet to said regulating means and conduit means connecting said regulating means and said fuel reservoir means, said regulating means maintaining a substantially constant pressure differential between the pressure of air delivered to said fuel reservoir means and the chamber pressure.

4. The gas turbine of claim 3 including lubrication delivery means, said lubrication delivery means including oil reservoir means connected to said impeller means, said impeller means delivering air to said oil reservoir means under pressure greater than the pressure in said compression chamber.

5. In a gas turbine, a casing providing a compression chamber, a shaft journaled in said casing, compression wheel means and turbine wheel means mounted on said shaft, combustion chamber means in said compression chamber, and fuel delivery means for delivering fuel to said combustion chamber means, said fuel delivery means including impeller means mounted on said shaft within said compression chamber and regulating means, first conduit means connecting said impeller means and said regulating means, said impeller means delivering air from said compression chamber to said regulating means under pressure greater than the pressure in said compression chamber, second conduit means connecting said regulating means and said fuel reservoir means, said regulating means delivering pressurized air to said fuel reservoir means, said regulating means maintaining a substantially constant pressure differential between the pressure of the air delivered to the fuel reservoir means and the compression chamber pressure, and third conduit means connecting said regulating means and said combustion chamber means for delivering fuel thereto.

6. A gas turbine comprising:
  a casing providing a compression chamber,
  a shaft journaled in said casing,
  compression wheel means and turbine wheel means mounted on said shaft,
  combustion chamber means in said compression chamber,
  and fuel delivery means for delivering fuel to said combustion chamber means, said fuel delivery means including:
    (i) impeller means mounted on said shaft within said compression chamber and regulating means,
      said regulating means including:

(A) a diaphragm housing,
(B) a diaphragm mounted within said diaphragm housing and providing upper and lower diaphragm chambers within said diaphragm housing,
(C) a first valve housing on said diaphragm housing providing a first valve chamber,
said diaphragm housing having a first valve opening whereby said first valve chamber and said upper diaphragm chamber may communicate,
(D) a first valve within the first valve housing biased to close said first valve opening,
(E) a second valve housing on said diaphragm housing providing a second valve chamber,
said diaphragm housing having a second valve opening whereby said second valve chamber and said second lowered diaphragm chamber may communicate,
(F) a second valve within the second valve housing biased to close said second valve opening,
(ii) first conduit means connecting said impeller means and said first valve chamber,
said impeller means delivering air from said compression chamber to said regulating means under pressure greater than the pressure in said compression chamber,
(iii) second conduit means connecting said upper diaphragm chamber and said fuel reservoir means,
said regulating means delivering pressurized air to said fuel reservoir means,
said regulating means maintaining a substantially constant pressure differential between the pressure of the air delivered to the fuel reservoir means and the compression chamber pressure,
(iv) third conduit means connecting said lower diaphragm chamber and said combustion chamber mean for delivering fuel thereto,
(v) fourth conduit means connecting said upper diaphragm chamber and said second valve chamber,
(vi) fifth conduit means connecting said lower diaphragm chamber and said compression chamber,
(vii) and pin means carried by said diaphragm, said pin means engaging said first valve to open said first valve opening when said diaphragm moves toward said first valve housing and engaging said second valve to open said second valve opening when said diaphragm moves toward said second valve housing.

7. The gas turbine of claim 6 in which said impeller means includes an impeller wheel mounted on said shaft, said impeller wheel including an air intake adjacent said shaft and an air outlet spaced radially outwardly of said air intake, and conduit means extending from said air outlet to said fuel reservoir means.

8. The gas turbine of claim 6 including spring means biasing said diaphragm toward said first valve housing.

References Cited

UNITED STATES PATENTS

| | | | |
|---|---|---|---|
| 1,379,179 | 5/1921 | Good | 158—28 |
| 1,394,894 | 10/1921 | Good | 158—28 |
| 2,706,888 | 4/1955 | Ballantyne et al. | 60—39.28 |
| 2,886,133 | 5/1959 | Mauck et al. | 60—39.08 XR |
| 2,986,433 | 5/1961 | Herrmann. | |
| 3,056,259 | 10/1962 | Jubb et al. | 60—39.28 |
| 3,324,655 | 6/1967 | Kaplan | 60—39.16 |

JULIUS E. WEST, *Primary Examiner.*